United States Patent Office 3,336,231
Patented Aug. 15, 1967

3,336,231
DEFOAMER COMPOSITIONS AND PROCESSES
Byron E. Marsh, Western Springs, Donald J. Berenschot, Chicago, and Clarence H. Wiley, Evanston, Ill., assignors to Armour and Company, Chicago, Ill., a corporation of Delaware
No Drawing. Filed Mar. 14, 1966, Ser. No. 555,657
6 Claims. (Cl. 252—152)

This application is a continuation-in-part of our co-pending application Ser. No. 98,329, filed Mar. 27, 1961.

This invention relates to defoaming compositions and to processes for preparing the same. It more particularly relates to foam inhibitors and foam breakers containing silicones and alkylene oxide adducts of primary and secondary amines.

Undesired foam formation and retention is a costly nuisance often detrimental to product quality and to processing efficiency. Even in instances where some foam may be desired, as in household detergents, control of foam formation and rapid dispersion thereof is usually important.

Silicones have been widely used for their efficient defoaming properties. Silicone defoamers, however, have deficiencies which detract from their usefulness as foam inhibitors and dispersants. In addition to being costly, silicones at significant concentrations reduce the adhesion properties of most substances. For example, a film forming substance such as paint will not adhere properly to surfaces covered by the film if a significant amount of silicone is present. The incorporation of silicones may be very useful in controlling foam during formulation and mixing of paints, but the amount of added silicone must be kept quite low or the paint will not properly adhere to surfaces coated with it. Also, although silicone defoamers may be advantageously employed to control foam of surfactants used in metal cutting and grinding processes, if appreciable amounts of silicone remain on the metal the costs of cleaning, fabricating and finishing the metals will be subsequently increased.

It is therefore an object of this invention to provide foam depressant compositions which are effective at low concentrations in liquids having a tendency to foam. It is a particular object of this invention to provide compositions for controlling the formation and rapid dispersion of foam in liquids containing surface active chemicals. A further object is the provision of stable homogenous defoamer compositions which are highly resistant to component separation normally resulting from exposure to heating and freezing temperatures. Another object is the provision of methods for rapidly dispersing foam or froth.

We have discovered that by combining alkylene oxide-containing tertiary amines with presently used silicone defoamers unexpectedly effective and inexpensive defoamer compositions are formed. Such combinations are especially effective in controlling formation and dispersion of foam in aqueous solutions of anionic, cationic, non-ionic and amphoteric surfactants. These properties render the compositions most suitable for use in paper manufacture, bottle filling operations, foam control in cooling tower waters, boiler waters, sewage, and automatic dish washing formulations.

Compounds of the following type are effective foam depressants and retardants in combination with polymerized silicones.

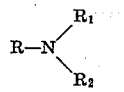

wherein R is an aliphatic hydrocarbon having from about 8 to about 18 carbon atoms, $R_1$ is R or $R_2$, and $R_2$ is the radical

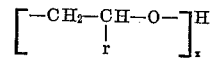

in which r is hydrogen, methyl or ethyl and x is an integer of 1 to about 50, provided that when $R_1$ is $R_2$ the compound contains from 2 to 60 moles of polyalkylene oxides.

The fatty tertiary amine constituents most useful in this invention are ethylene, propylene or butylene oxide adducts of primary and secondary amines containing 1 to 15 moles of alkyleneoxide.

The silicone component of the compositions of this invention are the organopolysiloxanes containing silicon and organic groups in a molecule in which the siloxane unit, —Si—O—Si—, is the continuing framework. Silicone fluids such as dimethylpolysiloxane and methylphenylpolysiloxane may be used. The dimethylpolysiloxane oils which may be used in preparing the defoaming compositions of this invention may be represented by the formula

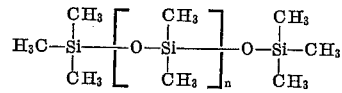

in which n is an integer which varies over a wide range. Generally, n may vary from about 0 to 2000 and represents the degree of polymerization influencing the viscosity of the composition. The viscosity of the silicones employed in this invention may vary over a wide range; from about 100–1500 centistokes at 25° C. Preferred viscosities for the purpose of this invention are less than 1000 centistokes at 25° C. Excellent results have been obtained using dimethylpolysiloxanes having a viscosity of from about 300 to 1000 centistokes at 25° C.

The silicone compositions for use in this invention may be used with other siliceous material such as silica in the form of a siliceous aerogel. The addition of up to about 1 weight percent, on the basis of the silicone, of silica dioxide has been utilized in silicone defoaming compositions to distribute the silicone throughout the foaming system.

Silicone defoamers are well known in the art and silicone polymers of the character disclosed in a publication entitled, "Dow Corning Fluids," published by Dow Corning Corporation, Midland, Mich., and cataloged in the library of the United States Patent Office on Feb. 17, 1945, are suitable for use in this invention.

Previously known polymerized silicone defoamer products having this invention applied to them are not only potentiated so as to be effective at far lower concentrations, but additionally become strikingly persistent in defoaming action.

Because the basic components of the compositions are relatively immiscible, it is desirable to supply the compositions in the form of temperature stable homogeneous emulsions. By blending the amine and silicone components in water with an emulsifying salt, such as an alkylene oxide amine acetate, a stable and blended preparation can be prepared.

Although effective potentiating levels of amine in silicone varies to a wide extent, largely dependent upon the foaming system to which the combination is applied, generally about 3 to 4 parts by weight of tertiary amine in 1 part by weight of silicone yields suitable preparations.

For a fuller understanding of this invention reference should be made to the following detailed examples.

EXAMPLE I

A solution containing 1% by weight of an anionic type surfactant, tetrapropylene benzene sulfonate, was prepared. Various defoamer preperations were tested in portions of this solution. Stoppered graduates containing 50 cc. of a 1% solution of the surfactant or the surfactant plus the indicated defoamer agent were shaken for a specified time. Foam height immediately after shaking was recorded. The time elapsing between the end of shaking to a complete disappearance of foam was also noted. The above mentioned observations and the amount of defoamer according to this invention necessary to effectively break the foam within a reasonable length of time is shown in the following table:

| Defoamer | Grams of Defoamer | Foam Height, cc. | Foam Break |
|---|---|---|---|
| Control | | 85 | More than 5 min. |
| C-120 Silicone [1] | 0.5648 | 3 | 45 seconds. |
| Propomeen C/25 [2] | 0.7698 | 40 | More than 5 min. |
| 3 parts by wt. Propomeen C/25, 1 part by wt. C-120 Silicone | 0.0652 | 2 | 10 seconds. |
| 4 parts by wt. Propomeen C/12, 1 part by wt. C/120 Silicone | 0.0825 | 3 | 15 seconds. |

[1] C-120 Silicone, trademark applied to fluid dimethylpolysiloxane with less than 1% silica aerogel, Dow Corning Corporation, Midland, Michigan.
[2] Propomeen C/25, trademark applied to coco, dipropoxylated tertiary amine containing 15 moles of propylene oxide, Armour and Company. Coco refers to the aliphatic radical having from 8 to 18 carbon atoms derived from fatty acids obtained from coconut oil.

EXAMPLE II

The same procedure as Example I was followed except a cationic type surfactant, trimethyl, tallow quaternary ammonium chloride (50% active) wherein tallow refers to the aliphatic radical having from 14 to 18 carbon atoms derived from fatty acids obtained from tallow, was used.

| Defoamer | Grams of Defoamer | Foam Height, cc. | Foam Break |
|---|---|---|---|
| Control | | 85 | More than 5 min. |
| C-120 Silicone | 0.2626 | 2 | 1 min. |
| Propomeen C/25 | 0.9346 | 15 | More than 5 min. |
| 3 parts by wt. Propomeen C/25, 1 part by wt. C-120 Silicone | 0.0383 | (1) | 3 seconds. |
| 4 parts by wt. Propomeen C/12, 1 part by wt. C-120 Silicone | 0.0324 | (1) | 5 seconds. |

[1] Rapid disappearance of foam prevented accurate measurement.

EXAMPLE III

The same procedure as Example I was followed except a non-ionic type surfactant, Triton X-100 (alkyl aryl polyether alcohol) was used.

| Defoamer | Grams of Defoamer | Foam Height, cc. | Foam Break |
|---|---|---|---|
| Control | | 50 | More than 5 min. |
| C-120 Silicone | 0.0522 | | 10 seconds. |
| Propomeen C/25 | 0.8009 | 30 | More than 5 min. |
| 3 parts by wt. Propomeen C/25, 1 part by wt. C-120 Silicone | 0.0386 | (1) | 5 seconds. |
| 4 parts by wt. Propomeen C/12, 1 part by wt. C-120 Silicone | 0.0390 | (1) | 5 seconds. |

[1] Rapid disappearance of foam prevented accurate measurement.

EXAMPLE IV

The same procedure as Example I was followed except an amphoteric type surfactant of the formula

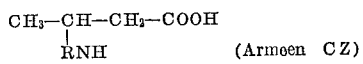

(Armeen CZ)

wherein R is an aliphatic radical derived from coco fatty acids, was used.

| Defoamer | Grams of Defoamer | Foam Height, cc. | Foam Break |
|---|---|---|---|
| Control | | 85 | More than 5 min. |
| C-120 Silicone | 0.3288 | | 45 seconds. |
| Propomeen C/25 | 0.6798 | 35 | More than 5 min. |
| 3 parts by wt. Propomeen C/25, 1 part by wt. C/120 Silicone | 0.1139 | 5 | 30 seconds. |
| 4 parts by wt. Propomeen C/12, 1 part by wt. C/120 Silicone | 0.1075 | 3 | 1 min. |

EXAMPLE V

Homogeneous blends having wide-range temperature stability may be prepared by the below outlined procedure.

A blend having the following formula was prepared:

| | Weight percent |
|---|---|
| Propomeen C/25 | 28.8 |
| Silicone C/120 | 9.6 |
| Ethomeen S/12 [1] | 7.2 |
| Acetate salt of coco-dipolyoxypropylene amine | 6.4 |
| Water | 48.0 |

[1] Soya, diethoxylated tertiary amine wherein soya is an aliphatic radical containing from 16 to 18 carbon atoms as derived from fatty acids obtained from soybeans, and having two moles of ethylene oxide adduct.

The silicone and Ethomeen S/12 are mixed together using a high speed mixer. One-half of the water and the coco-dipolyoxypropylene amine acetate are added next while mixing is continued. After thorough mixing, the coco-dipolyoxypropylene amine is added and agitation is continued until the remainder of the water has been slowly added and incorporated. The total batch is given continued mixing until a homogeneous light colored creamy product is obtained.

Formulations of this general type after being frozen will return to original form upon thawing. They will break when heated to temperatures above 175° F. but will reform with slight agitation when the temperature is lowered. They are pourable at 35° F. Solvents and other like ingredients may be incorporated into the combinations if desired.

EXAMPLE VI

The formulation of Example V was evaluated by procedures set forth in Example I. In the following table the amount of the defoamer is listed in percentage of active ingredients as indicated:

ANIONIC TYPE SURFACTANT—TETRAPROPYLENE BENZENE SULFONATE

| Defoamer | Amt. of Defoamer, percent | Foam Height After Shaking, cc. | Time For Complete Foam Break |
|---|---|---|---|
| Control | | 85 | More than 5 min. |
| Silicone | 0.1 | 3 | 45 seconds. |
| Combination | 0.1 | 2 | 10 seconds. |

CATIONIC TYPE SURFACTANT ARQUAD C [1]

| Control | | 85 | 5 min. |
|---|---|---|---|
| Silicone | 0.05 | 3 | 1 min. |
| Combination | 0.005 | (2) | 3 seconds. |

NONIONIC TYPE SURFACTANT—ALKYL ARYL POLYETHER ALCOHOL

| Control | | 50 | 5 min. |
|---|---|---|---|
| Silicone | 0.01 | (2) | 8 seconds. |
| Combination | 0.007 | (2) | 5 seconds. |

AMPHOTERIC TYPE SURFACTANT—ARMEEN CZ

| Control | | 85 | Less than 5 min. |
|---|---|---|---|
| Silicone | 0.06 | 3 | 45 seconds. |
| Combination | 0.02 | 5 | 30 seconds. |

[1] Trademark applied to trimethyl coco-quaternary ammonium chloride, 50% active.
[2] Foam broke too fast to measure accurately.

EXAMPLE VII

The same procedure as Example I was followed using sodium alkyl benzene sulfonate as an anionic surfactant. The silicone antifoaming agent used was 99+% dimethylpolysiloxane containing less than 1% silica having the following properties:

| | | |
|---|---|---|
| Silicone oil | percent | 99+ |
| Silicone dioxide | do | <1 |
| Wt./gal. | pounds | 8.4 |
| Specific gravity, 25°/25° C. | | 1.01 |
| Viscosity at 25° C. | centistokes max. | 1000 |
| Flash point, open cup F. | min. | 600° |

The dimethylpolysiloxanes are polymers of varying lengths and thus only an average molecular weight may be ascertained. The average molecular weight on the basis of viscosity was found to be about 26,500. The following results were obtained:

| Defoamer | Grams of Defoamer | Foam Height, cc. | Foam Break |
|---|---|---|---|
| Control | | 160 | More than 150 min. |
| Silicone Antifoaming Agent. | 0.5648 | 2 | 5 sec. |
| Propomeen C/25 | 0.7698 | 40 | 100 min. |
| 3 parts by wt. Propomeen C/25 and 1 part by wt. Silicone Antifoaming Agent. | 0.0652 | Nil | |
| 4 parts by wt. Propomeen C/25 and 1 part by wt. Silicone Antifoaming Agent. | 0.0652 | Nil | |

EXAMPLE VIII

The same procedure and chemicals as Example VII were used except the anionic type surfactant was sodium lauryl sulfate, and the following results obtained:

| Defoamer | Grams of Defoamer | Foam Height, cc. | Foam Break |
|---|---|---|---|
| Control | | 150 | More than 300 min. |
| Silicone Antifoaming Agent. | 0.5648 | 2 | 2 sec. |
| Propomeen C/25 | 0.7698 | 120 | 131 min. |
| 4 parts by wt. Propomeen C/25 and 1 part by wt. Silicone Antifoaming Agent. | 0.0825 | Nil | |

EXAMPLE IX

The same procedure and chemicals as Example VII were used except a cationic surfactant, tallow, trimethyl quaternary ammonium chloride (50% active), was substituted for the anionic surfactant. The following results were obtained:

| Defoamer | Grams of Defoamer | Foam Height, cc. | Foam Break |
|---|---|---|---|
| Control | | 40 | 125 min. |
| Silicone Antifoaming Agent | 0.2626 | 2 | 1 sec. |
| Propomeen C/25 | 0.9346 | 50 | 35 min. |
| 3 parts by wt. Propomeen C/25 and 1 part by wt. Silicone Antifoaming Agent. | 0.0383 | Nil | |
| 4 parts by wt. Propomeen C/25 and 1 part by wt. Silicone Antifoaming Agent. | 0.0324 | Nil | |

EXAMPLE X

An emulsion was prepared as in Example V using the silicone antifoaming agent described in Example VII. An evaluation was carried out as in Example VI and following results obtained:

ANIONIC TYPE DETERGENT—SODIUM ALKYL BENZENE SULFONATE

| Defoamer | Grams of Defoamer | Foam Height, cc. | Foam Break |
|---|---|---|---|
| Control | | 160 | More than 150 min. |
| Silicone Antifoaming Agent. | 0.10 | 2 | 15 sec. |
| Emulsion | 0.10 | Nil | |

ANIONIC TYPE DETERGENT—SODIUM LAURYL SULFATE

| Defoamer | Grams of Defoamer | Foam Height, cc. | Foam Break |
|---|---|---|---|
| Control | | 150 | More than 300 min. |
| Silicone Antifoaming Agent. | 0.10 | 10 | 15 min. |
| Emulsion | 0.10 | Nil | |

CATIONIC TYPE DETERGENT—ARQUAD C-50

| Defoamer | Grams of Defoamer | Foam Height, cc. | Foam Break |
|---|---|---|---|
| Control | | 100 | 45 min. |
| Silicone Antifoaming Agent. | 0.05 | 2 | 2 sec. |
| Emulsion | 0.05 | Nil | |

AMPHOTERIC TYPE DETERGENT—ARMEEN CZ

| Defoamer | Grams of Defoamer | Foam Height, cc. | Foam Break |
|---|---|---|---|
| Control | | 100 | More than 200 min. |
| Silicone Antifoaming Agent. | 0.06 | 10 | 15 sec. |
| Emulsion | 0.02 | 5 | 1 sec. |

While in the foregoing specification various embodiments of this invention have been described in considerable detail for the purpose of illustration, it will be appreciated by those skilled in the art that this invention is susceptible to other embodiments and that many of these details can be varied widely without departing from the basic concept and spirit of the invention.

We claim:

1. A composition having synergistic defoaming abilities in aqueous solutions consisting essentially of an effective quantity of alkoxylated fatty tertiary amine having the formula

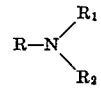

wherein R is an aliphatic hydrocarbon radical having from about 8 to 18 carbon atoms, $R_1$ is a member of the class consisting of R and $R_2$, wherein $R_2$ is the alkylene oxide radical

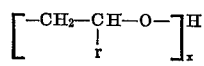

wherein $r$ is a member of the class consisting of H, —$CH_3$, and —$CH_2CH_3$, and $x$ is from 1 to 50 provided that when $R_1$ equals $R_2$ the molecule contains from 2 to 60 moles of said alkylene oxide; and an organic polysiloxane selected from the group consisting of dimethylpolysiloxane and methylphenylpolysiloxane, having a viscosity of from about 100 to 1500 centistokes at 25° C.; and wherein said amine constitutes from about 3 to 4 parts by weight and said polysiloxane constitutes 1 part by weight.

2. The composition of claim 1 wherein the organic polysiloxane is dimethylpolysiloxane having the formula

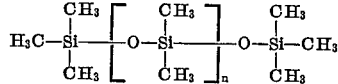

wherein $n$ is an integer from 0 to 2000.

3. The composition of claim 2 wherein said dimethylpolysiloxane has a viscosity from about 300 to 1000 centistokes at 25° C.

4. The composition of claim 1 having up to about 1 weight percent, on the basis of the organic polysiloxane, of silica dioxide.

5. The composition of claim 1 wherein said alkylene oxide radical is selected from the group consisting of $$[-CH_2-CH_2O-]_xH$$

and $$\left[-CH_2\underset{CH_3}{CH}O-\right]_xH$$

wherein $x$ is from 1 to 15.

6. A low foam, rapid-break detergent composition for aqueous solutions consisting essentially of effective quantities of a detergent selected from the group consisting of sodium alkyl benzene sulfonate, trimethyl tallow quaternary ammonium chloride, alkyl aryl polyether alcohol, and B(N-Coco amino)butyric acid, alkoxylated fatty tertiary amine having the formula $$R-N\begin{smallmatrix}R_1\\ \\R_2\end{smallmatrix}$$

wherein R is an aliphatic hydrocarbon radical having from about 8 to 18 carbon atoms, $R_1$ is a member of the class consisting of R and $R_2$, wherein $R_2$ is the alkylene oxide radical $$\left[-CH_2-\underset{r}{CH}-O-\right]_xH$$

wherein $r$ is a member of the class consisting of H, —$CH_3$, and —$CH_2CH_3$, and $x$ is from 1 to 50 provided that when $R_1$ equals $R_2$ the molecule contains from 2 to 60 moles of said alkylene oxide; and an organic polysiloxane selected from the group consisting of dimethylpolysiloxane and methylphenylpolysiloxane, having a viscosity of from about 100 to 1500 centistokes at 25° C.; and wherein said amine constitutes from about 3 to 4 parts by weight and said polysiloxane constitutes 1 part by weight.

No references cited.

LEON D. ROSDOL, *Primary Examiner.*

S. E. DARDEN, *Examiner.*